United States Patent [19]

Schwarz et al.

[11] Patent Number: 4,621,520
[45] Date of Patent: Nov. 11, 1986

[54] LEAKAGE DETECTION AND TRACKING SYSTEM

[75] Inventors: Frederick M. Schwarz; Barry L. Stoner, both of Glastonbury, Conn.

[73] Assignee: United Technologies Corporation, Hartford, Conn.

[21] Appl. No.: 655,123

[22] Filed: Sep. 26, 1984

[51] Int. Cl.⁴ ............................................. G01M 3/02
[52] U.S. Cl. .................... 73/40; 73/40.5 R; 415/118
[58] Field of Search .............................. 73/40, 40.5 R; 60/226.1; 415/118

[56] References Cited

U.S. PATENT DOCUMENTS 3,593,567  7/1971  Hartley ................................. 73/40
3,918,291  11/1975  Pauley et al. ......................... 73/40

FOREIGN PATENT DOCUMENTS 66730  5/1980  Japan ............................. 73/40.5 R Primary Examiner—Stewart J. Levy
Assistant Examiner—Hezron E. Williams
Attorney, Agent, or Firm—Norman Friedland

[57] ABSTRACT

Leakage monitoring for a nacelle forcing a turbine type power plant powering aircraft is achieved by measuring the pressure inside and outside (or ambient) of the nacelle with and without a given quantity of flow added inside the nacelle and calculating the leakage by use of the isentropic flow curve. Temperatures may also be sensed at different stations within the nacelle to predict the location of the leakage.

4 Claims, 2 Drawing Figures

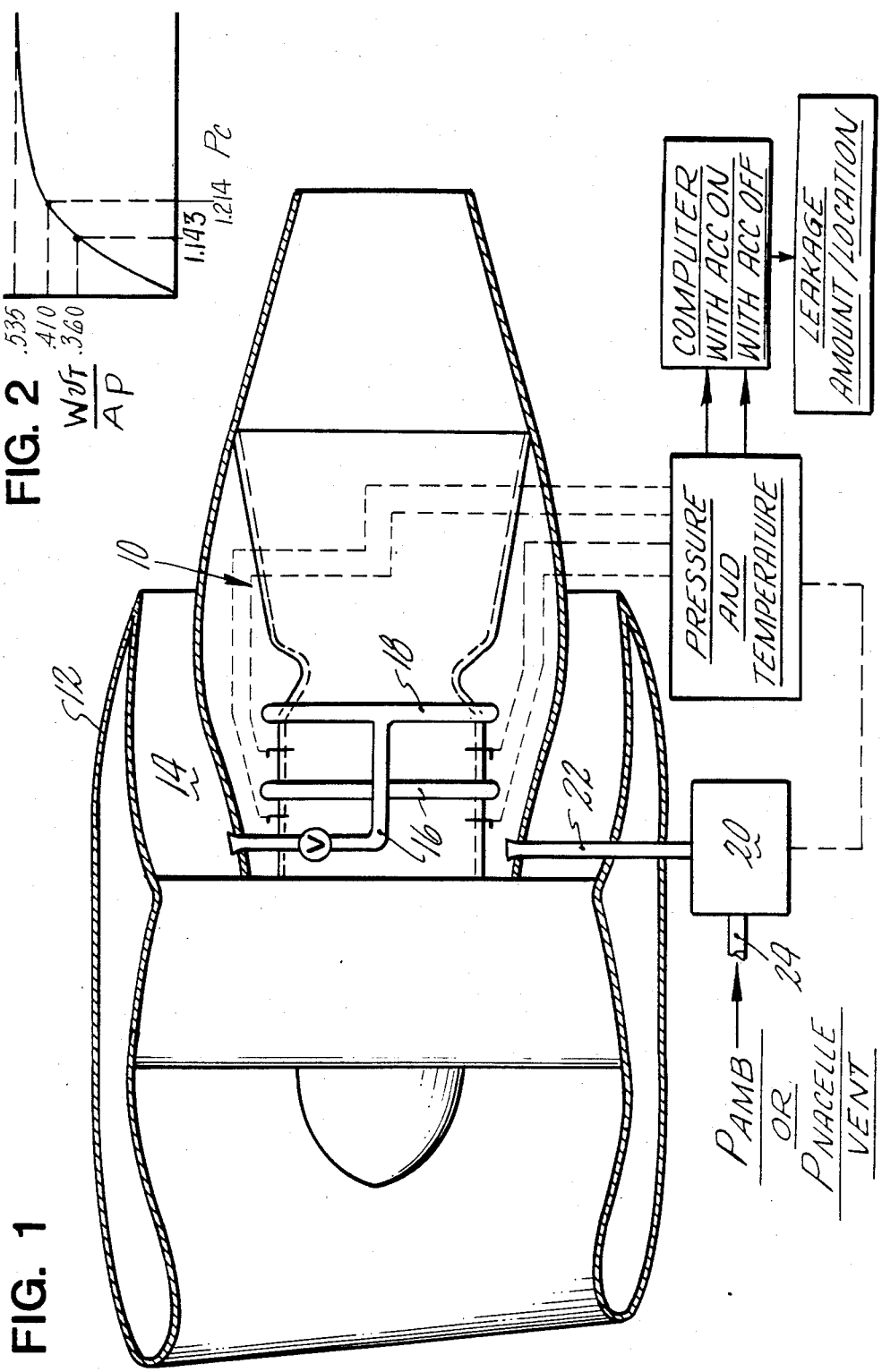

LEAKAGE DETECTION AND TRACKING SYSTEM

DESCRIPTION

1. Technical Field

This invention relates to nacelles for aircraft powered by a turbine type power plant and particularly to means for ascertaining and tracking air leakage within the nacelle.

2. Background Art

As is well known, air leakage from the nacelle occasioned by the many ducts, flanges, joints and connections in the power plant and nacelle create a source of drag to the aircraft, and lost engine work, and consequently a reduction in fuel economy. Obviously, because of the high cost of fuel it becomes abundantly important to be able to ascertain this leakage and compute it in terms of loss of thrust specific fuel consumption (TSFC). This enables the aircraft operator to determine whether it is more expedient to remove the aircraft from service to resolve the leakage problem or to leave the aircraft in service notwithstanding the extra cost resulting from the loss of TSFC. Hence, as is apparent, it would be an advantage in this decision making process to track the leakage from the nacelle and calculate the leakage in terms of loss of TSFC as well as to ascertain the source of the leakage.

To this end, we have found that we can track the leakage from the nacelle of aircraft by measuring the pressure difference between the interior of the nacelle and the exterior of the nacelle (ambient) and compute its value relative to a known quantity of air admitted into the nacelle. In this manner we can achieve a representative leakage value notwithstanding the fact the leakage area and leakage discharge coefficient of the leaking orifices are unknown. By use of a general or special purpose computer, which is typically available either on ground or in the aircraft, this value can be tracked continuously and either converted in terms of TSFC loss or used as a standard to establish maintenance procedures. By measuring the temperature of the air within the nacelle, it is possible to ascertain whether the leak is from a cool source or a hot source. The temperature data would also have an effect on the TSFC value inasmuch as a leak from a hotter station in the engine gas path has a greater influence on TSFC than does a leak from a lower temperature source.

In certain installations it is contemplated that the temperature and pressure being monitored would be recorded by an on-board flight data recording instrument and this data would be fed to a suitable computer on the ground or within the aircraft to obtain the necessary calculations.

DISCLOSURE OF INVENTION

An object of this invention is to provide for aircraft means for tracking the leakage from the nacelle and calculate it in terms of loss of TSFC. A feature of this invention is to measure the pressure differential between air pressure outside the nacelle and within the nacelle during periods of time when a given air flow is added to the nacelle and without the given air flow.

Another feature of this invention is to include a temperature sensor to aid in determining the source of the leakage.

Other features and advantages will be apparent from the specification and claims and from the accompanying drawings which illustrate an embodiment of the invention.

BRIEF DESCRIPTION OF DRAWINGS

FIG. 1 is an illustration, partly in section and partly in schematic, of this invention.

FIG. 2 is a graphical representation of an isentropic flow curve.

BEST MODE FOR CARRYING OUT THE INVENTION

While this invention is described in its preferred embodiment being employed with a fan/jet type power plant, as will be apparent to one skilled in the art, it is applicable to any type of power plant that is housed in a nacelle. Also, although the system to be described is conveniently employed where active clearance control (ACC) of the type that flows air on the exterior of the engine case such as that described in U.S. Pat. No. 4,069,662 granted to I. H. Redinger, Jr. et al on Jan. 24, 1978 and assigned to the same assignee of this patent application is used, this is not a necessary element to practice this invention.

As noted from FIG. 1, a turbine type power plant (fan/jet) 10 is housed in the nacelle generally indicated by reference numeral 12. In the fan type engine as shown, a bypass duct 14 is typically formed by the nacelle for leading fan air overboard. As mentioned above, this embodiment incorporates an active clearance control and reference should be made to the U.S. Pat. No. 4,069,662 supra, for details thereof. Suffice it to say, fan discharge air is bled from the discharge duct 14 into manifold 16 for feeding spray bars 16 and 18. The spray bars flow the air onto the engine casing to cause it to shrink in order to control the tip clearance of the rotating blades (compressor and/or turbine). This air flows either rearwardly and discharges with the engine discharge air or leaks through the skin of the nacelle as does other leakages within the nacelle. These leakage paths are not shown as it is obvious that nacelles in current use are notorious for their leakage problems.

The invention serves to measure and track this leakage and compute it in terms of assisting those concerned with maintenance to ascertain when to fix such leakages. Further, the invention contemplates sensing the temperature to ascertain the source of such leakage.

In accordance with this invention the pressure differential by a suitable pressure differential transducer generally indicated by reference numeral 20 senses the pressure inside the nacelle by a suitable pressure tap and line 22 and the pressure outside the nacelle by a suitable pressure tap and line 24. The transducer converts these values to produce an output signal indicative of the differential which is either recorded in a flight data recorder or fed to a computer directly. The computer may be a special or general purpose computer that calculates the value and compares it to values of pressure differential signals that have to be obtained when a given air flow was injected into the nacelle.

Obviously, in installations that employ active clearance controls of the type described in U.S. Pat. No. 4,069,662 this air may be obtained by flowing the air through the spray bars. The purpose of measuring the pressure differential before and after the known flow injection will be apparent from the following discussion.

Since the area of the leakage openings vary considerably and continuously, and since the discharge coefficient is not conveniently known, the calculations presented will account for these unknown by making proportions when a given flow is injected into the nacelle to when this flow is shut off. By making these proportions or ratios, the leakage can be calculated in terms of TSFC with sufficient degree of accuracy to prognosticate when these leakages should be attended to. The best way of understanding the calculations necessary to arrive at these ratios is by considering the following example.

In this example the following symbols will be used.
P = pressure
$P_c$ = pressure within the nacelle
$P_a$ = pressure outside the nacelle or (ambient)
w = air flow #/sec
T = temperature
A = total leakage area
PSIA = pounds per square inch absolute
$C_D$ = overboard leakage's discharge coefficient
Assume the following measurements
$P_c$ = 4.0 PSIA
$P_a$ = 3.5 PSIA Calculate the pressure ratio (aircraft instrumentation is suitable to convert the pressure differential signal to the ratio signal).

$$P_c/P_a = 4.0/3.5 = 1.143$$

From the well known isentropic curve depicted in FIG. 2

$$\frac{w\sqrt{T}}{AP C_D} = .36$$

Assume the active clearance control (ACC) when turned on flows 1.0#/sec ($W_{ACC}$) (other means can be utilized to flow a given quantity of air).

Assume $P_c'$ (after ACC is turned on) measures 4.25 PSIA.

Calculate the pressure ratio as follows $$P_c'/P_a' = 4.25/3.5 = 1.214$$

From the isentropic curve of FIG. 2

$$\frac{w'\sqrt{T}}{AP_c'} = .41$$

Since the ratio of the air flow parameter $$\frac{w\sqrt{T}}{AP}$$

is as follows $$\frac{\frac{w\sqrt{T}}{AP_c C_D}}{\frac{w'\sqrt{T}}{AP_c' C_D}} = \frac{\frac{w\sqrt{T}}{P_c}}{\frac{w'\sqrt{T'}}{P_c'}} = \frac{.36}{.41} = .878 = R$$

The area value cancels out, along with the discharge coefficient. $P_c$, $P_c'$, T, and T' are measured.
Since $$w' = w + (1.0\#/sec)$$
$$= w + W_{ACC}$$

Therefore, $$w = R\left(\frac{w'\sqrt{T}}{P_c'}\right)\frac{P_c}{\sqrt{T}}$$

$$w = W_{ACC}\left[\left(\frac{P_c'\sqrt{T}}{RP_c\sqrt{T'}}\right) - 1\right]^{-1}$$

Solving for leakage flow (W) gives $$W = 1\left[\left(\frac{1}{.878}\right) - 1\right]^{-1}$$

$$= 7.197\#/sec$$

(ignoring the small pressure and temperature changes for the purpose of this example).

This value can then be converted into fuel consumption loss.

Assume the temperature sensed was 300°.

This compared to the normal 400° temperature (without leakage) would indicate that at say, 35,000 ft. alt. this is below normal and the leak is from the fan air.

It should be understood that the invention is not limited to the particular embodiments shown and described herein, but that various changes and modifications may be made without departing from the spirit and scope of this novel concept as defined by the following claims.

We claim:

1. A tracking system to ascertain the amount of air leakage from a nacelle housing an engine powering aircraft, said system comprising means for sensing pressure inside and outside the nacelle in the quiescent state and in the state when a given amount of air is fed into the nacelle for providing a first and second signal indicative of the ratio of said pressures in each of said states, said nacelle having a particular configuration for flowing compressible fluid which is air and the flow characteristics of the air is expressed by an isentropic curve means for calculating the amount of leakage from said isentropic curve by selecting the air flow parameter defining a given value for each of said signals and means responsive to a proportion of said given values to indicate when said leakage is beyond a given value.

2. A tracking system as in claim 1 wherein said engine includes an externally mounted active clearance control impinging air on the case of the engine, and means for turning on said active clearance control to provide the state when a given amount of air is fed into the nacelle.

3. The method of monitoring the air leakage from a nacelle housing a gas turbine power plant subjected to air leakage comprising the steps of
   a. sensing the pressure within said nacelle in both the quiescence state and the state when a predetermined amount of air is ingested into the nacelle for generating a first signal and a second signal;
   b. sensing the pressure outside the nacelle for generating a third signal;

c. calculating the ratio of the first and third signal and the ratio of the second and third signal for obtaining a fourth signal and a fifth signal;

d. generating a function relationship that is indicative of the isentropic flow characteristic of air by plotting a curve of the variables of $$\frac{W\sqrt{T}}{A_p}$$

versus $P_c$, where W is air flow in pounds per second, T is temperature, A is the total leakage area and P is the pressure;

e. compute the flow parameters from the relationship between the air flowing into the nacelle and out of the nacelle from the isentropic flow curve obtained from the prior immediate step from the ratios calculated in the step of calculating for generating a sixth signal and seventh signal; and f. calculate the amount of leakage that is present in the nacelle by proportioning the sixth signal to the seventh signal.

4. The method as in claim 3 including an active clearance control externally of the engine and actuating said active clearance control to flow air to impinge on said engine and flow a predetermined amount of air through said nacelle.

* * * * *